Figure 1:
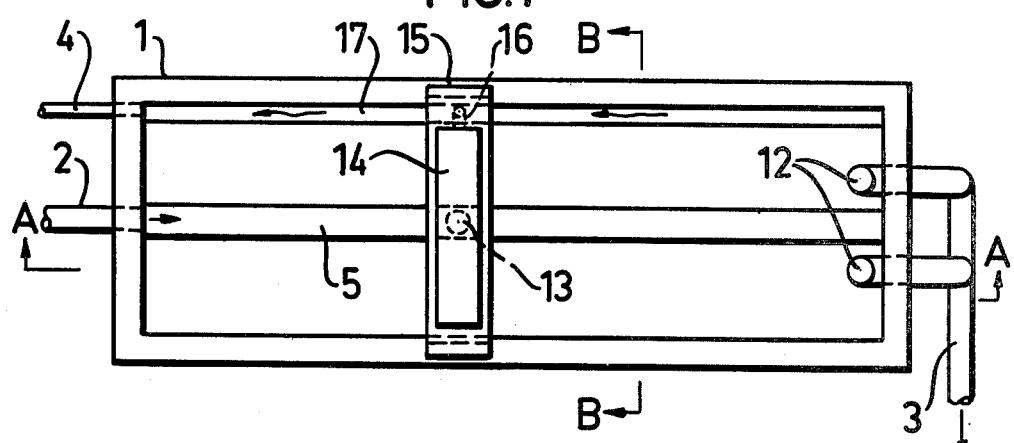

United States Patent [19]

Jacquet

[11] Patent Number: 4,482,457

[45] Date of Patent: Nov. 13, 1984

[54] FILTERING APPARATUS

[75] Inventor: Sten F. Jacquet, Hägersten, Sweden

[73] Assignee: Carex Process AB, Hagersten, Sweden

[21] Appl. No.: 491,195

[22] PCT Filed: Aug. 16, 1982

[86] PCT No.: PCT/SE82/00261

§ 371 Date: Apr. 4, 1983

§ 102(e) Date: Apr. 4, 1983

[87] PCT Pub. No.: WO83/00637

PCT Pub. Date: Mar. 3, 1983

[30] Foreign Application Priority Data

Aug. 17, 1981 [SE] Sweden ............................. 8104869

[51] Int. Cl.³ .............................................. B01D 23/24
[52] U.S. Cl. ...................................... 210/270; 210/271
[58] Field of Search ................ 210/270, 271, 274, 280

[56] References Cited

U.S. PATENT DOCUMENTS

| | | | |
|---|---|---|---|
| 628,987 | 7/1899 | Maignen | 210/274 |
| 2,182,095 | 12/1939 | Pruyn | 210/270 |
| 2,287,983 | 6/1942 | Gavett | 210/270 |
| 2,315,254 | 3/1943 | Fraser | 210/270 |
| 2,396,769 | 3/1946 | Asch | 210/271 |

Primary Examiner—Ivars Cintins
Attorney, Agent, or Firm—Burns, Doane, Swecker & Mathis

[57] ABSTRACT

The invention relates to an apparatus for filtering a suspension or emulsion and comprising a bed (6, 7) of a particulate filter material arranged in a container or tank (1), one or more inlets (8) arranged at the lower part of the bed for the suspension or emulsion to be filtered, means (3) for removing filtrate and arranged above the bed, elevator means (13) for conveying contaminated filter medium from the lower part of the bed to a means (14) for washing or other treatment of the filter medium, and means for recycling treated filter medium to the upper part of the bed. According to the invention, the elevator means (13) for conveying contaminated filter medium is arranged movable along the horizontal extent of the filter bed and is preferably placed on a carrier means (14) which can be given a reciprocating movement, is arranged above the filter bed and also carries the means (14) for treating the filter medium.

7 Claims, 4 Drawing Figures

FILTERING APPARATUS

This invention relates to an apparatus for filtering a suspension or emulsion. The invention especially relates to an apparatus for continuous filtering of suspensions and emulsions in the purification of waste water, but is not restricted to this use only.

A method and an apparatus for filtering a suspension or emulsion are described in U.S. Pat. Nos. 4,126,546 and 4,197,201. According to these patents, the suspension or emulsion to be filtered is introduced somewhat above the bottom of a bed of a particulate filter medium and is led upwards through the filter bed, suspended and emulsified material being separated and remaining in the bed while the purified filtrate is recovered from a liquid layer formed above the upper surface of the filter bed. The filter bed is enclosed in a container having a substantially cylindrical shape and the lower portion of which is made substantially conical. A filter medium which has been contaminated by taking up the separated material is recovered from the downwardly directed container end and is moved to the surface of the liquid layer above the filter bed where it is led downwards in countercurrent to a part of the purified filtrate and is washed in this way. The washed filter medium is then distributed over the surface of the filter bed so that the filter medium will circulate, i.e. it sinks into the bed at the same time as it gets into contact with an ever more contaminated suspension or emulsion to be filtered, and is finally recycled to the upper part of the liquid phase for repeated washing. The filtrate contaminated by the washing of the filter medium is kept separated from the other, purified filtrate and is removed separately. In an embodiment shown, the contaminated filter medium is conveyed upwards through a pipe extending through the filter bed by means of air which is introduced at the lower part of the pipe so that the filter medium is moved upwards through a mammoth pump effect.

The known filtering apparatus has a number of excellent advantages. Thus, no movable parts within the filtering apparatus as such are required, and an extremely good filtering effect is obtained. However, the apparatus also has certain shortcomings. Thus, due to its essentially cylindrical shape, the available floor space is inefficiently utilized, and therefore its capacity will be unnecessarily restricted. Furthermore, its use is restricted to merely filtration of such suspensions and emulsions where the contaminated filter medium can be purified merely by simple washing with a purified liquid phase, and no other treatment of the filter medium is possible. In certain cases, e.g. in purification of oil-containing water, a further treatment of the filter medium may be necessary, however, and sometimes it is desired to recover the suspended or emulsified material removed from the liquid phase. At times, it is also desirable to carry out washing at an elevated temperature, and this is not possible with the previously known apparatus.

The above-mentioned disadvantages are eliminated by the present invention, and a filtering apparatus for suspensions or emulsions is provided where the embodiment of the apparatus can be made more flexible, and the available space can be utilized better in this way so that the capacity can be increased. The treatment of the contaminated filter medium can also be varied to a considerable extent so that the apparatus will be more generally useful.

According to the invention, there is provided an apparatus for filtering a suspension or emulsion and comprising a bed of a particulate filter material arranged in a container, one or more inlets for the suspension or emulsion to be filtered, arranged at the lower part of the bed, means arranged above the bed for the removal of filtrate, elevator means for conveying filter medium contaminated by the filtration from the lower part of the bed to means for washing or other treatment of the filter medium, and means for recycling treated filter medium to the upper part of the bed, the invention being characterized in that the means for conveying the contaminated filter medium is arranged movable along the horizontal extent of the filter bed.

The means for conveying the filter medium, its treatment and recycling of filter medium are preferably arranged on a carrier device, which can be given a reciprocating movement and is positioned above the filter bed.

The invention is illustrated more in detail by accompanying drawing, in which

Figure 2:
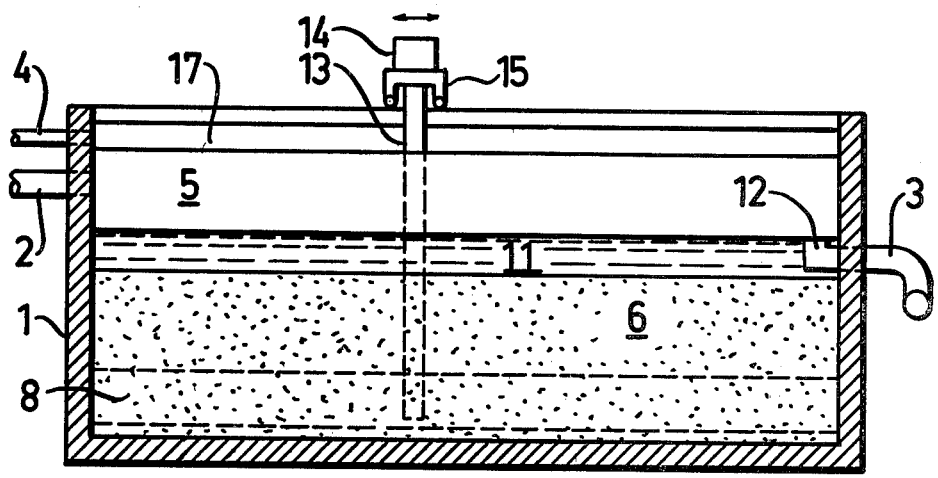
Figure 3:
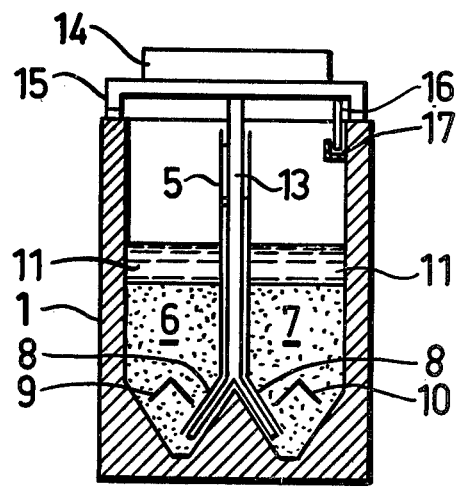

FIG. 1 is a top plan view of an embodiment of an apparatus according to the invention, FIG. 2 shows a longitudinal section of the apparatus along the line A—A in FIG. 1, and FIG. 3 shows a cross section of the apparatus along the line B—B in FIG. 1.

Figure 4:
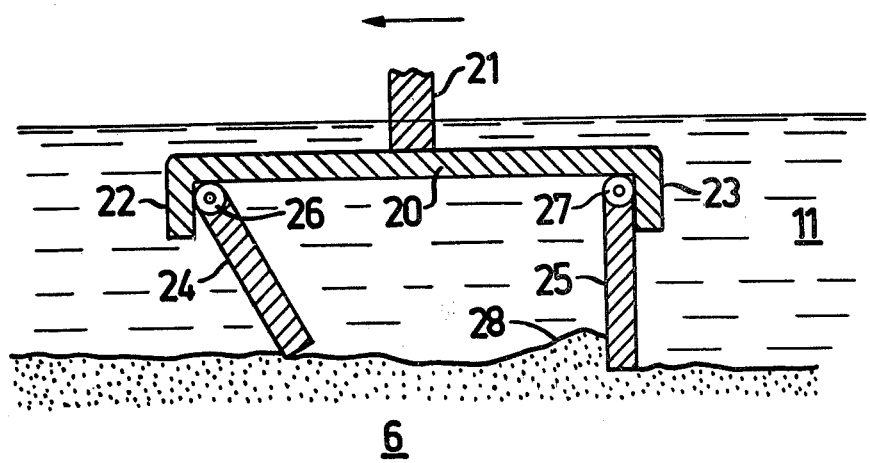

FIG. 4 schematically shows an example of a scraping device for evening out the filter bed.

According to FIG. 1, the filtering apparatus comprises a tank 1, which is provided with a supply line 2 for the suspension or emulsion to be filtered, an outlet pipe 3 for filtrate, and an outlet line 4 for washing liquid and material removed from the filter medium at its treatment. The supply line 2 is connected to an inlet channel 5 extending along the whole tank 1. In the embodiment shown, the supply channel extends along the centre line of the tank and in this way divides the tank into two active parts, as is more clearly apparent from FIG. 3. However, thisis not strictly necessary, and the supply channel 5 can also extend along one of the longitudinal walls of the tank so that the tank will have only one active space for filtering.

The tank 1 is substantially rectangular. This is a suitable embodiment, as most often the available space in buildings is best utilized in this way. However, other embodiments are also possible. The bottom of the tank tapers off in cross-section in a V-shaped configuration, and when it is divided into several parts by the supply channel 5 this also applies to each partial volme of the tank, as can be seen in FIG. 3. In the tank there is arranged a filter medium, which for instance can consist of filter sand, and in the embodiment shown in FIG. 3 the filter medium forms two filter beds 6 and 7. The bed of filter material has usually an extent in at least one horizontal direction which considerably exceeds its height.

The supply channel 5 extends down through the filter medium or along one of the longitudinal sides of the tank, and its lower part 8 is bent in order to follow one inclined part of the V-shaped bottom in a spaced relation and to end close to the lowest point of the bottom near which the suspension or emulsion to be filtered is discharged into the filter bed. The suspension or emulsion will thereafter flow upwards through the filter bed and be purified during its passage. In order to reduce the risk of clogging the outflow opening and to distribute the downward flow of the filter medium over the surface of the whole filter bed, it is suitable to arrange longitudinal, roof-shaped profiles 9 and 10 in the filter bed at some distance above the outflow opening of the suspension or emulsion. Furthermore, longitudinal guide plates may be arranged in the filter bed to make the flow of the filter medium in the bed more uniform over the whole surface of the bed. This reduces the risk of the bed getting clogged at local points. As an example, simple inclined plates may be placed in the bed at about the same level as the roof-shaped profiles 9 and 10 and extending in the longitudinal direction of the bed.

In a preferred embodiment, the channel walls 8 are provided with rows of openings 18 at a level above the lower end of the channel wall and above the level of the profiles 9 and 10. Thus, the suspension or emulsion will maintly flow out into the bed through these openings, and this will bring about considerable advantages, as will be described in greater detail below. When the channel walls are provided with holes, it is also preferable that small roof-shaped profiles are arranged above each hole and extending laterally across the filter bed. This will give a more uniform distribution of the incoming flow of the suspension into the bed. Such a lateral profile is shown at 19 in FIG. 3 of the drawing.

An advantage with the supply channel in accordance with the invention is that the entering aqueous suspension or emulsion is deaerated in the supply channel, so that no dissolved or entrapped air is carried out into the filter bed. This makes complicated means for removing air from the filter bed unnecessary.

Furthermore, heavy particles and sludge do not enter the filter bed, but settle directly at the bottom of the supply channel and are removed therefrom directly together with the contaminated filter medium. Therefore, such particles cannot enter the filter bed and clog it, as is the case with the filtering apparatus previously described. In that apparatus, the heavy particles either settle in the inlet, at low flow velocities, or in the filter bed, at high flow velocities. In either case, clogging results.

The supply channel also serves as a buffer to even out variations in pressure when the suspension or emulsion is pumped to the filter. As the level in the supply channel will rise slowly, there will be no sudden pressure rises, and the on-off effect from the pump will be evened out. This eliminates the risk of a local lifting of the filter bed and filter breakthrough.

Also, when a chemical precipitation is carried out directly in the filter, it is advantageous to have a certain contact time for mixing and reaction. This is of special importance when the temperatures of the liquids treated are low. The construction of the supply channel provides a contact time of a number of minutes, which is quite sufficient. In the filter of the prior art, it has been shown that the inlet does not have a sufficient volume to give a satisfactory contact time at low temperatures.

After the suspension or emulsion has flowed through the filter bed, it forms a layer of clean liquid or filtrate above the bed. The filtrate is carried away through the discharge pipe 3, the outlet port 12 of which in the tank can be made as a weir.

In FIG. 3 it is shown how the contaminated filter medium is conveyed to purification or another treatment. In the supply channel 5 there is arranged a receiving pipe 13, which extends down below the level of the out flow opening of the supply channel and the contaminated filter medium is conveyed through this pipe up to an apparatus for treatment, which is schematically indicated at 14. In the embodiment shown in FIG. 3, where the tank is divided into two compartments, each with their filter bed, the receiving pipe may be in the form of a Y and can be connected to both the compartments at the same time, or two separate receiving pipes can be arranged with one in front of the other, seen in the longitudinal direction of the tank. For the upward conveying of the filter medium, a device of the mammoth pump type can be used, air being blown down through a pipe (not shown) placed within the receiving pipe and also ending at the mouth of the latter but somewhat higher than this, so that no great amounts of air are discharged outside the receiving pipe. The air discharged into the receiving pipe strives to move upwards and will then bring along a mixture of liquid and contaminated filter medium and convey it to the treating means 14. The embodiment of such a mammoth pump device is also described in the previously mentioned U.S. Pat. Nos. 4,126,546 and 4,197,201.

In a preferred embodiment, the elevator means with its receiving pipe 13 is arranged in the supply channel 15. This, however, is not strictly necessary, and the elevator means and its receiving pipe may be arranged in a separate channel of its own, which may be shaped like the supply channel and arranged along the opposite longitudinal wall of the tank. In this embodiment, the supply channel will usually not have to extend all the way to the bottom of the tank, as the suspension is usually fed into the filter bed at points higher than the bottom, as has been described earlier. If the supply channel and the channel for the elevator means are separate from each other, they may also be arranged along the same longitudinal wall of the tank, with the channel for the elevator means nearest to the wall and extending to the bottom of the tank, and the supply channel arranged on the inside of the elevator means channel and extending downwards to a level above the bottom level of the tank. As earlier, both channels also extend in the longitudinal direction of the tank along the whole length of the tank.

The elevator means with the receiving pipe 13 is arranged to be moved forwards and backwards along the tank in the supply channel 5. Because of this, contaminated filter medium will successively be conveyed from the bottom of the filter bed along the whole tank so that no filter medium is left untreated, and most preferably the contaminated filter medium is conveyed from a point in the filter bed which is lower than the point or points where the suspension or emulsion is introduced into the bed. For this, the receiving pipe 13 is preferably attached to a gantry device which is shown schematically at 15 and which can be given a reciprocating movement in the longitudinal direction of the tank. The reciprocating movement is achieved by means of suitable driving motors and control devices, shich are not shown in the drawing.

It is preferred that the lower part of the receiving pipe 13 is flexible in both the longitudinal and the transverse direction, as this provides a good possibility to keep the level of sand and sludge constant in the supply channel 5. At an increased level, the lower part of the mammoth pump drags along the layer of sand and sludge, as the gantry device travels back and forth, and sucks off this layer to such a level that the contaminated filter medium is automatically conveyed out from the filter.

In mammoth pump devices of the described kind, excess air is often blown out from the suction end of the pump. This air is led directly out in the supply channel and rises to the surface of the liquid without causing any adverse effects. In filters of the prior art type, however, such air is let out into the filter bed, and special devices for separating and removing this air are necessary.

When the load on a filter changes, the pressure drop through it also changes. At higher loads, the pressure drop increases, and it is desirable to control the amount of filter medium conveyed in accordance therewith. As the mammoth pump device is placed in the supply channel and communicates therewith, the head of the pump decreases as the pressure drop increases, and a self-regulation of the capacity of the pump is obtained. Experiments have shown that the self-regulation of the conveyed amount of filter sand is about 35% at a variation of the load on the filter between 20% and 100%.

At high pressure drops, which may occur at high filtering speeds or in the filtering of especially thick suspensions, there is a risk that the filter bed "hangs" and forms vaults at the bottom of the filter. If this happens, no filter medium is fed to the mammoth pumps, which will then pump the suspension only, and the filter will clog completely within a short time. This can be remedied by providing a temporary equalization of the pressure at the part of the filter bed which is washed. For this, the receiving pipe of the mammoth pump is provided with an obturating device which partly or completely closes then opening 18 in front of which the pipe is just the situated at its travel back and forth. This will mean that when the mammoth pump passes a certain position in the filter bed, no suspension will flow out into the bed at this position, and a temporary equalization in the pressure will be obtained in the part of the bed being washed, so that the formation of vaults is being eliminated. The obturating device may simply consist of a plate arranged on the pipe to cover the opening in question and having a size adapted to the size of said opening. Such an obturating device may also be arranged in the supply channel when this channel is separate from the channel wherein the mammoth pump device moves, and be connected with the movable mammoth pump device by various means which are easily apparent for one skilled in the art.

The treatment means 14 for the contaminated filter medium is also mounted on the gantry means 15. After the treatment, the purified filter medium is returned to the filter beds 6 and 7 by means of a suitable depositing means not shown in the drawing. Thus, this purified filter medium will be deposited on top of the respective filter bed so that a circulation of filter medium is obtained. The suspension or emulsion to be filtered will also countercurrently meet ever cleaner filter medium during its flow upwards through the bed, which improves the efficiency of the filter.

The material removed from the filter medium at its treatment, e.g. washing liquid and removed dirt, is led away from the treatment means through the conduit 16 to the gutter 17 and the discharge line 4. The gutter 17 extends along the whole tank and the removed material can thus be carried away continuously independently of the movement of the gantry means 15.

In an embodiment which can be suitable when the tank 1 has not a great length in comparison with its width, a movable gantry means 15 is not used but the treating means 14 is fixed above the tank. The receiving pipe 13 is instead arranged movable along the bottom ot the tank 1 with a reciprocating movement so that also here contaminated filter medium is conveyed upwards along the whole tank for treatment. The receiving pipe 13 with the pipe for blowing down air can here be made of a flexible material, such as plastics or rubber and can be moved forwards and backwards along the bottom of the tank by means of a suitable mechanical device. This embodiment can be simpler and cheaper than the embodiment with a movable gantry means for filtering tanks having a small length.

The treatment means 14 for the contaminated filter medium can be made and work in several various manners. Most commonly, the filter medium is washed with a liquid and is then returned to the filter bed while the contaminated washing liquid is led to the gutter 17. Washing can then be carried out with clean filtrate which is pumped by means of a suitably arranged conduit (not shown) upwards from the liquid phase over the filter bed, or else with an unfiltered liquid phase which is taken up from the inlet channel or, depending on the design, can be led to the washing means by gravity. In certain cases, the liquid carried along by the filter medium when it is conveyed upwards may be sufficient for the washing.

The washing means as such can for example consist of an inclined screw conveyor, in which the filter medium is washed and freed from liquid. The liquid then exits from the lower end of the screw while the filter medium is transported to the upper end of the screw to be returned thereafter to the filter bed. It is possible here to add additional agents in the washing such as solvents and chemicals to increase the washing effect. Furthermore, the washing can be carried out at another temperature than ambient temperature, usually at an elevated temperature, whereby steam can also be used for the washing. This can be suitable in the treatment of filter medium used in purification of oil-containing water. Moreover, solid particles carried along can be separated from the filter medium, e.g. by sedimentation, screening or by magnetic means. This may be suitable in treatment of certain types of suspensions or emulsions, e.g. those containing suspended metal particles.

Thus, it is possible to separate and to recover suspended or emulsified materials entrained by the contaminated filter medium.

The treatment means is arranged completely above the filter, which gives unique possibilities to monitor its function. All parts may be completely visible and it is easy to measure various parameters. In prior art filters, the washing of the filter medium is submerged and cannot be closely followed.

In the treatment, the filter medium is exposed to air, and this is of importance if anaerobic bacteria occur in the filter. When the anaerobic bacteria are exposed to oxygen, their growth is prevented, which decreases the risk of clogging the filter by bacterial growth. Through the quick circulation of the filtering medium, this exposure to oxygen occurs about every second hour.

It is also possible to wash the filter medium with some other liquid than the filtrate, and this makes it possible to continue the washing after stopping the flow of suspension or emulsion to the filter.

When the washing device for the filter medium is arranged as one or more inclined screws, it is preferable that the housing for the screw or screws is made somewhat larger than the screws themselves, so that there will be a clearance between the screw threads and the walls of the housing. In this way, a part of the washed filter medium can recirculate, which gives a simulated longer washing.

It is also preferable to add the washing liquid to the filter medium at a point somewhat below the highest point of the screw conveyor, where the washed filter medium is recycled to the tank. In this way, there will be a certain dewatering of the filter medium before it is returned to the tank.

It has also been found that when the washed filter medium is recycled to the filter bed, this recycling may be somewhat irregular, so that after some time, the upper surface of the bed is no longer horizontal, but shows a slight inclination from one end to the other. This is due to slight irregularities in the conveying and treating devices for the filter medium and may be remedied by providing the moving gantry means with scraping means which extend under the surface of the filtrate to the level of the filter bed. During the movement of the gantry means back and forth, the scraping means even out the surface of the bed. In a preferred embodiment, the scraping means consist of two scraping blades, one arranged in front of the other as seen in the direction of travel of the gantry means. The scraping blades are also hinged in such a way that the front blade, seen in the direction of travel, can hinge back and only drags along the surface of the bed, while the rear blade is held against a catch and cannot hinge back, and thus will scrape against the surface of the bed to even it out. When the gantry means reverses its travel at one of its end positions, the rear blade now becomes the front blade and may hinge back to drag along the surface of the bed, while the front blade will now become the rear blade and cannot hinge back, but will now scrape against the surface of the bed. In this way, the bed will be evened out at each travel of the gantry device, but no filter medium will be collected at the ends of the bed. Hinging mechanisms having a catch to prevent the hinging in one direction are well known to those skilled in the art.

FIG. 4 schematically shows a longitudinal section view of an example of a scraping device of the type described above. In the figure, a holder 20 is connected to the gantry device (not shown) via an upright 21. At its ends, the holder is provided with lugs 22 and 23, which extend downwards. Inside of the lugs 22 and 23, the scraper blades 24 and 25 are mounted on hinges 26 and 27. The whole device is mounted in the filtrate phase 11 at such a height that the scraper blades reach the filter bed 6.

When the gantry means are moved in the direction of the arrow, the scraping means is also moved in the same direction. At this movement, the front scraper blade 24 is free to hinge back and drag freely over the bed 6, and thus does not act on the filter medium in the bed. The rear scraper blade 25, however, is prevented from hinging back by the lug 23 and is thus forced to act on the bed to even it out, as is shown by the mound of filter medium 28. When the gantry means and the scraper means reach their end position, their movement is reversed, so that the scraper blade 25 is now free to drag along the surface of the bed, while the scraper blade 24 is prevented by the lug 22 from hinging back, and will thus act on the bed to even it out.

It should be noted that the embodiment of the apparatus of the invention shown and described here is only an example and that several variants are possible without going outside of the scope of the invention. Thus, as has been described earlier, the suspension or emulsion to be filtered can e.g. be introduced in the filter through a separate channel arranged therein which is not the same as the channel in which the elevator means for the contaminated filter medium is moved. Moreover, as stated above, it is not necessary that the tank is divided into two parts by the supply channel, but the supply channel can be arranged along one side wall of the tank which then, consequently comprises one single space for the filter bed. The gutter 17 is then preferably placed at the opposite wall of the tank. Such variants appear clearly to one skilled in the art.

The filtering apparatus according to the invention is made of a material selected considering the suspensions or emulsions to be filtered. The most common use of the apparatus will be in connection with filtration with filter sand in purification of waste water or other water, and for such an application, suitable construction materials are well-known to one skilled in the art. The tank can thus be made of concrete or metal plate aand the other conduits and channels of metall plate or a suitable plastic material such as hard PVC. Materials are known meeting the demands that must be made in each specific case with regard to mechanical strength and corrosion resistance.

The filter of the invention has shown a number of important advantages in comparison with the prior art filters described in the foregoing. Thus, the filter in accordance with U.S. Pat. Nos. 4,126,546 and 4,197,201 cannot be made wider than 2 meters, which gives a maximum filter surface of about 3 square meters for each module. Experiments have shown that at greater widths, the filter medium does not move uniformly through the filter bed and that there is a risk of breakthrough at high loads.

If the filter of the invention is given a maximum width of 2 meters for each half of the filter, this means a doubling of the possible width in comparison with the prior art filter. Furthermore, experiments have shown that each gantry device with its treatment means can effectively clean the filter medium in a filter length of 6 to 8 meters, depending on the type of suspension or emulsion filtered. This means that each gantry device with its treatment means can effectively purify the filter medium over an area which is about ten times the area of the prior art filter.

Furthermore, in the prior art filter, the whole bed of filter medium is continuously moving slowly downwards, while the filtrate moves upwards. This means that flocculated sludge and other suspended materials are continuously exposed to shear forces between the moving particles of filter medium. Flocks and suspended materials are broken up and will thus advance farther up in the filter bed than if said bed had been stationary. This must be compensated for by a higher filter bed, so that no breakthrough occurs. The effective height of the bed in the prior art filter must therefore be at least one meter.

In the filter of the invention, the whole bed is stationary with exception for the cross-sectional part which is actually under treatment. This makes it mossible to use much lower heights of the filter bed, and in comparison with a prior art filter of the same capacity, only half the bed height is necessary and gives a good margin of security against breakthrough.

The lower bed height means that the filter medium is recirculated in a shorter time, which is about half of the corresponding time for a prior art filter. This gives a lower risk of clogging the filter by bacterial growth, expecially in the filtering of organic material.

The building height necessary is also decreased to a large degree, which strongly influences the building costs.

A filter in accordance with the invention has been used in a practical experiment wherein pre-sedimented municipal wastewater has been filtered. The filter bed used had a surface area of 2.1 m² and a height of 0.5 m, and consisted of filter sand. The flow of liquid through the filter was 7.6 m³ per hour. To the suspension to be filtered was added 100 grams of aluminum sulfate per cubic meter, which corresponds to an addition of about 40 mg of suspended solids per liter.

Two experiments were carried out on two different days. In the experiments, the biochemical oxygen demand during seven days ($BOD_7$), the concentration of suspended solids (SS), the total concentration of phosphorus ($P_{tot}$) and the turbidity in Jackson Turbidity Units (JTU) were determined in the ingoing suspension and in the filtrate, as well as the percentage reduction of these values. The suspended solids in the wash water was also determined. In the experiments, about 5% of the filtrate was used for washing the filter sand. The results obtained are summarized in the following table:

| Analysis | A | | | B | | |
|---|---|---|---|---|---|---|
| | In | Out | % Red. | In | Out | % Red. |
| $BOD_7$, mg/l | 30 | 15 | 50 | 140 | 23 | 85 |
| SS, mg/l | 40 + 55 | 3.4 | 96 | 40 + 105 | 3 | 98 |
| $P_{tot}$, mg/l | 1.7 | 0.03 | 98 | 5.0 | 0.05 | 99 |
| Turbidity, JTU | 45 | 6.5 | 85 | 84 | 3.2 | 96 |
| SS in wash water mg/l | | 1750 | | | 2400 | |

From this table, it is evident that with the filter of the present invention, a very considerable filtering efficiency is obtained, in combination with the advantages mentioned in the foregoing description.

Thus, by the present invention, there is provided an apparatus making possible a continuous and efficient filtration of suspensions and emulsions of extremely varying types. By the construction of the apparatus, it can very easily be adapted to the available space and the required capacity so that a maximal utilization is obtained. As the method in the treatment of the contaminated filter medium can be varied within extremely wide limits, a very versatile usefulness of the apparatus will be achieved.

I claim:

1. An apparatus for filtering a suspension or emulsion, comprising an elongated bed of particulate filter material arranged in a container, one or more inlets for the suspension or emulsion to be filtered, arranged at the lower part of said bed and extending downward through the bed of the filter material so as to allow the suspension or emulsion to be filtered to flow in countercurrent to the filter material, means for the removal of filtrate, arranged above said bed, elevator means for conveying filter medium contaminated by the filtration from the lower part of the bed to means for washing or other treatment of the filter medium, said elevator means including an inlet conduit for air so as to transport the contaminated filter medium upwards, scraping means arranged to scrape along the upper surface of the filter bed at the same time as the movable elevator means is moved along the bed, and means for recycling treated filter medium to the upper part of the bed, wherein an elongated inlet channel for the suspension or emulsion to be filtered extends along the entire length of the container with said elevator means provided in the inlet channel, and the means for conveying the contaminated filter medium is arranged movably along the horizontal extent of the filter bed.

2. The apparatus in accordance with claim 1, characterized in that the elevator means for conveying the filter medium to its treatment and the means for recycling the treated filter medium are arranged on a carrier device, which is positioned above the filter bed and which can be given a reciprocating movement.

3. The apparatus in accordance with claim 1, characterized in that the means for conveying, recycling and treating the contaminated filter medium comprise a fixed carrier device, which carries the treating means, while the elevator means is arranged to be given a reciprocating movement while it is connected to said treating means.

4. The apparatus in accordance with claim 1, characterized in that the elevator means for the filter medium is arranged in a channel which is separate from the inlet channel.

5. The apparatus in accordance with claim 1, characterized in that the treating means for contaminated filter medium comprises means for separation and recovery of suspended or emulsified matter which has been entrained by the contaminated filter medium.

6. The apparatus in accordance with claim 1, characterized in that flow guiding roofs are arranged above the inlet opening or openings for the suspension or emulsion to be filtered.

7. The apparatus in accordance with claim 1, characterized in that it is provided with an obturating device which at least partly shuts off the flow of suspension or emulsion into the bed at certain positions along the bed when the elevator means passes said positions.

* * * * *